US007992165B1

(12) United States Patent
Ludewig et al.

(10) Patent No.: US 7,992,165 B1
(45) Date of Patent: Aug. 2, 2011

(54) INSERTION OF DIGITAL MEDIA

(75) Inventors: Carl Ludewig, San Rafael, CA (US); Alex Xueyuan Huang, Cupertino, CA (US)

(73) Assignee: Velti USA, Inc., San Francisco, CA (US)

( * ) Notice: Subject to any disclaimer, the term of this patent is extended or adjusted under 35 U.S.C. 154(b) by 532 days.

(21) Appl. No.: 11/674,570

(22) Filed: Feb. 13, 2007

Related U.S. Application Data

(60) Provisional application No. 60/789,680, filed on Apr. 6, 2006, provisional application No. 60/789,709, filed on Apr. 6, 2006.

(51) Int. Cl.
 *H04N 7/10* (2006.01)
 *H04N 7/025* (2006.01)
 *H04N 7/16* (2011.01)

(52) U.S. Cl. ............. 725/32; 725/34; 725/35; 725/36; 725/135; 725/136

(58) Field of Classification Search .............. 725/32, 725/34–36, 135, 136; 709/219; 705/14; 375/240.01–240.29
See application file for complete search history.

(56) References Cited

U.S. PATENT DOCUMENTS

| 6,034,746 | A  | * | 3/2000  | Desai et al. .............. 375/240.26 |
| 6,621,866 | B1 | * | 9/2003  | Florencio et al. ........ 375/240.25 |
| 6,757,735 | B2 | * | 6/2004  | Apostolopulos et al. ..... 709/231 |
| 7,006,976 | B2 | * | 2/2006  | Glatt ........................... 704/500 |
| 7,051,047 | B2 |   | 5/2006  | Jung et al. |
| 7,089,579 | B1 | * | 8/2006  | Mao et al. .................... 725/109 |
| 7,711,791 | B2 | * | 5/2010  | DuVall et al. ................ 709/217 |
| 2002/0116474 | A1 | * | 8/2002 | Copeland et al. ............ 709/219 |
| 2003/0018966 | A1 | * | 1/2003 | Cook et al. ........................ 725/2 |
| 2005/0114909 | A1 | * | 5/2005 | Mercier ......................... 725/141 |
| 2006/0015746 | A1 | * | 1/2006 | Kusudo et al. ................ 713/187 |
| 2007/0244929 | A1 | * | 10/2007 | Huang et al. ............... 707/104.1 |
| 2008/0040215 | A1 | * | 2/2008 | Huang et al. ................... 705/14 |

FOREIGN PATENT DOCUMENTS

WO  WO 9926415 A1 * 5/1999

OTHER PUBLICATIONS

JDK 5.0 Documentation, Sun Microsystems, 2004.*
QuickTime File Format, Apple Computer, Inc., Mar. 1, 2001.
QuickTime Overview, Apple Computer, Inc., Aug. 11, 2005.
David Singer and Mohammed Zubair Visharam, "MPEG-4 File Formats", Nice, Oct. 1995.
Rob Koenen, editor, MPEG-4 Overview (v. 21—Jeju Version), Mar. 2002.
ISO/IEC 14496-12, "Information technology-Coding of Audio Visual objects, Part 12; ISO base media file format", second edition Apr. 1, 2005, corrected version Oct. 1, 2005.

* cited by examiner

*Primary Examiner* — Scott Beliveau
*Assistant Examiner* — Alexander Q Huerta
(74) *Attorney, Agent, or Firm* — Baker Botts L.L.P.

(57) ABSTRACT

An example embodiment of the present invention provides a process for inserting a source media stream into a target media stream. The process opens and reads into memory structural information from a target media stream. The process then opens and reads into memory structural information from a source media stream. The process adjusts the structural information for both streams in order to effect the insertion of the source media stream into the target media stream. In the example embodiment, this adjustment avoids the use of temporary output storage. The process then writes onto an output media stream the adjusted structural information for the source and target media streams and then pipes onto the output media stream the media data for the source and target media streams. In particular embodiments, a container file format is used for the source media stream, target media stream, and output media stream.

24 Claims, 11 Drawing Sheets

| | | | | | | Section | Description |
|---|---|---|---|---|---|---|---|
| ftyp | | | | | | 4.3 | file type and compatibility |
| pdin | | | | | | 8.43 | progressive download information |
| moov | | | | | | 8.1 | container for all the metadata |
| | mvhd | | | | | 8.3 | movie header, overall declarations |
| | trak | | | | | 8.4 | container for an individual track or stream |
| | | tkhd | | | | 8.5 | track header, overall information about the track |
| | | tref | | | | 8.6 | track reference container |
| | | edts | | | | 8.25 | edit list container |
| | | | elst | | | 8.26 | an edit list |
| | | mdia | | | | 8.7 | container for the media information in a track |
| | | | mdhd | | | 8.8 | media header, overall information about the media |
| | | | hdlr | | | 8.9 | handler, declares the media (handler) type |
| | | | minf | | | 8.10 | media information container |
| | | | | vmhd | | 8.11.2 | video media header, overall information (video track only) |
| | | | | smhd | | 8.11.3 | sound media header, overall information (sound track only) |
| | | | | hmhd | | 8.11.4 | hint media header, overall information (hint track only) |
| | | | | nmhd | | 8.11.5 | Null media header, overall information (some tracks only) |
| | | | | dinf | | 8.12 | data information box, container |
| | | | | | dref | 8.13 | data reference box, declares source(s) of media data in track |
| | | | | stbl | | 8.14 | sample table box, container for the time/space map |
| | | | | | stsd | 8.16 | sample descriptions (codec types, initialization etc.) |
| | | | | | stts | 8.15.2 | (decoding) time-to-sample |
| | | | | | ctts | 8.15.3 | (composition) time to sample |
| | | | | | stsc | 8.18 | sample-to-chunk, partial data-offset information |
| | | | | | stsz | 8.17.2 | sample sizes (framing) |
| | | | | | stz2 | 8.17.3 | compact sample sizes (framing) |
| | | | | | stco | 8.19 | chunk offset, partial data-offset information |
| | | | | | co64 | 8.19 | 64-bit chunk offset |
| | | | | | stss | 8.20 | sync sample table (random access points) |
| | | | | | stsh | 8.21 | shadow sync sample table |
| | | | | | padb | 8.23 | sample padding bits |
| | | | | | stdp | 8.22 | sample degradation priority |
| | | | | | sdtp | 8.40.2 | independent and disposable samples |
| | | | | | sbgp | 8.40.3.2 | sample-to-group |
| | | | | | sgpd | 7.40.3.3 | sample group description |
| | | | | | subs | 8.41 | sub-sample information |
| | mvex | | | | | 8.29 | movie extends box |
| | | mehd | | | | 8.30 | movie extends header box |
| | | trex | | | | 8.31 | track extends defaults |
| | ipmc | | | | | 8.45.4 | IPMP Control Box |
| moof | | | | | | 8.32 | movie fragment |
| | mfhd | | | | | 8.33 | movie fragment header |
| | traf | | | | | 8.34 | track fragment |
| | | tfhd | | | | 8.35 | track fragment header |
| | | trun | | | | 8.36 | track fragment run |
| | | sdtp | | | | 8.40.2 | independent and disposable samples |
| | | sbgp | | | | 8.40.3.2 | sample-to-group |
| | | subs | | | | 8.42 | sub-sample information |
| mfra | | | | | | 8.37 | movie fragment random access |
| | tfra | | | | | 8.38 | track fragment random access |
| | mfro | | | | | 8.39 | movie fragment random access offset |
| mdat | | | | | | 8.2 | media data container |
| free | | | | | | 8.24 | free space |
| skip | | | | | | 8.24 | free space |
| | udta | | | | | 8.27 | user-data |
| | | cprt | | | | 8.28 | copyright etc. |
| meta | | | | | | 8.44.1 | metadata |
| | hdlr | | | | | 8.9 | handler, declares the metadata (handler) type |
| | dinf | | | | | 8.12 | data information box, container |
| | | dref | | | | 8.13 | data reference box, declares source(s) of metadata items |
| | ipmc | | | | | 8.45.4 | IPMP Control Box |
| | iloc | | | | | 8.44.3 | item location |
| | ipro | | | | | 8.44.5 | item protection |
| | | sinf | | | | 8.45.1 | protection scheme information box |
| | | | frma | | | 8.45.2 | original format box |
| | | | imif | | | 8.45.3 | IPMP Information box |
| | | | schm | | | 8.45.5 | scheme type box |
| | | | schi | | | 8.45.6 | scheme information box |
| | iinf | | | | | 8.44.6 | item information |
| | xml | | | | | 8.44.2 | XML container |
| | bxml | | | | | 8.44.2 | Binary XML container |
| | pitm | | | | | 8.44.4 | primary item reference |

FIG. 11

INSERTION OF DIGITAL MEDIA

CROSS-REFERENCE TO RELATED APPLICATIONS

This application is related to the following commonly-owned U.S. patents, whose disclosures are incorporated herein by reference in their entirety for all purposes: U.S. Provisional Application Ser. No. 60/789,680, entitled "Ad Campaign Management System for Mobile Devices", filed on Apr. 6, 2006, and U.S. Provisional Application Ser. No. 60/789,709, entitled "Dynamic Ad Insertion System", filed on Apr. 6, 2006.

TECHNICAL FIELD

The present disclosure relates to the insertion of one or more source media content into a target media content.

BACKGROUND OF THE INVENTION

As described in detail in the related applications incorporated by reference above, a scalable system has been developed that supports the dynamic insertion of advertisement media (or other digital content) into the content media communicated to mobile devices, such as cellular telephones and media players.

Inserting one piece of media into another is not simply a matter of splicing them together in a manner reminiscent of splicing film or analog audio tape. Many media file formats are specific to the encoding of their content. For example, MPG and MP3 file formats are each tightly tied to the underlying encoding of the media. Therefore, any software that processes files in these formats must have knowledge of the underlying encoding method or codec.

Furthermore, if the media to be inserted does not use the same encoding as the target media, the media to be inserted must be transcoded. Transcoding is the direct digital-to-digital conversion from one codec, usually lossy, to another. It involves decoding/decompressing the original data to a raw intermediate format (e.g., PCM for audio or YUV for video), in a way that mimics standard playback of the lossy content, and then re-encoding this into the target format.

A container file format is a computer file format that can contain various types of data, encoded by means of standardized codecs. Typically, a container file format will include an additional layer of indirection in the form of data pointers, which software can manipulate instead of the data itself. Consequently, container file formats facilitate editing in place, without copying of data.

MPEG-4 Part 14 is a standard for a container format for multimedia files. Since the official filename extension for MPEG-4 Part 14 files is .mp4, the container format is often referred to simply as MP4. The MP4 format is ordinarily used to store digital audio and digital video streams, where the term "stream" here refers to a succession of data elements made available over time. MP4 was initially based on Apple's QuickTime container format, but has since been improved. For the details of the latter container format, see the Quick-Time File Format (Apple, 2001 Mar. 1).

MP4 files have a logical structure, a time structure, and a physical structure, and these structures are not required to be coupled. The logical structure of the file is of a movie that in turn contains a set of time-parallel tracks of media streams. The time structure of the file is that the tracks contain sequences of samples in time, and those sequences are mapped into the timeline of the overall movie by optional edit lists. The physical structure of the file separates the data needed for logical, time, and structural de-composition, from the media data samples themselves.

Also in terms of physical structure, the MP4 file format is composed of object-oriented structures called 'atoms'. A unique tag and a length identify each atom. An atom can be a parent to other atoms or it can contain data, but it cannot do both. Most atoms describe a hierarchy of metadata giving information such as index points, durations, and pointers to the media data. This collection of atoms is contained in an atom called the 'movie atom'. The movie atom documents the logical and timing relationships of the samples, and also contains pointers to where they are located. Those pointers may be into the same file or another one, referenced by a URL. The media data itself is located elsewhere; it can be in the MP4 file, contained in one or more 'mdat' or media data atoms, or located outside the MP4 file and referenced via URL's.

Each media stream is contained in a track specialized for that media type (audio, video, etc.), and is further parameterized by a sample entry. The sample entry contains the 'name' of the exact media type (i.e., the type of the decoder needed to decode the stream) and any parameterization of that decoder needed. The name takes the form of a four-character code. There are defined sample entry formats not only for MP4 media, but also for the media types used by other organizations using this file format family. They are registered at the MP4 registration authority. See the white paper on MPEG-4 File Formats, by David Singer and Mohammed Zubair Visharam (October 1995, Nice).

Like most other modern container formats, the MP4 format supports streaming over a network, such as the Internet, or other stream-delivery mechanism. Streaming media is media that is consumed (e.g., heard or viewed) while it is being delivered. Streaming is more a property of the system delivering the media than the media itself. The term "streaming" is usually applied to media that is distributed over computer networks. Most other delivery systems are either inherently streaming, such as radio and television, or inherently non-streaming, such as books, video cassettes, and audio CDs.

The MP4 file format is a streamable format, as opposed to a streaming format. The file format is designed to be independent of any particular delivery protocol while enabling efficient support for delivery in general. Metadata in the file known as 'hint tracks' provide instructions, telling a server application how to deliver the media data over a particular delivery protocol. There can be multiple hint tracks for one presentation, describing how to deliver over various delivery protocols. In this way, the file format facilitates streaming without ever being streamed directly. See MPEG-4 Overview —(V.21—Jeju Version), edited by Rob Koenen (March 2002).

SUMMARY OF THE INVENTION

In particular implementations, the present invention provides methods, apparatuses and systems directed to real-time content insertion functionality that is scalable and capable of performing content insertion in high-demand environments.

BRIEF DESCRIPTION OF THE DRAWINGS

FIG. 11 is a table showing descriptions of atom (or box) types that are used in particular embodiments of the invention and the relationship between the types by way of an indentation hierarchy.

DETAILED DESCRIPTION OF EXAMPLE EMBODIMENTS

The following example embodiments are described and illustrated in conjunction with apparatuses, methods, and systems which are meant to be examples and illustrative, not limiting in scope. For example, the network environment set forth below is provided for didactic purposes to illustrate how one particular implementation of the invention may be deployed.

A. Network Environment for Insertion Server

Figure 1:
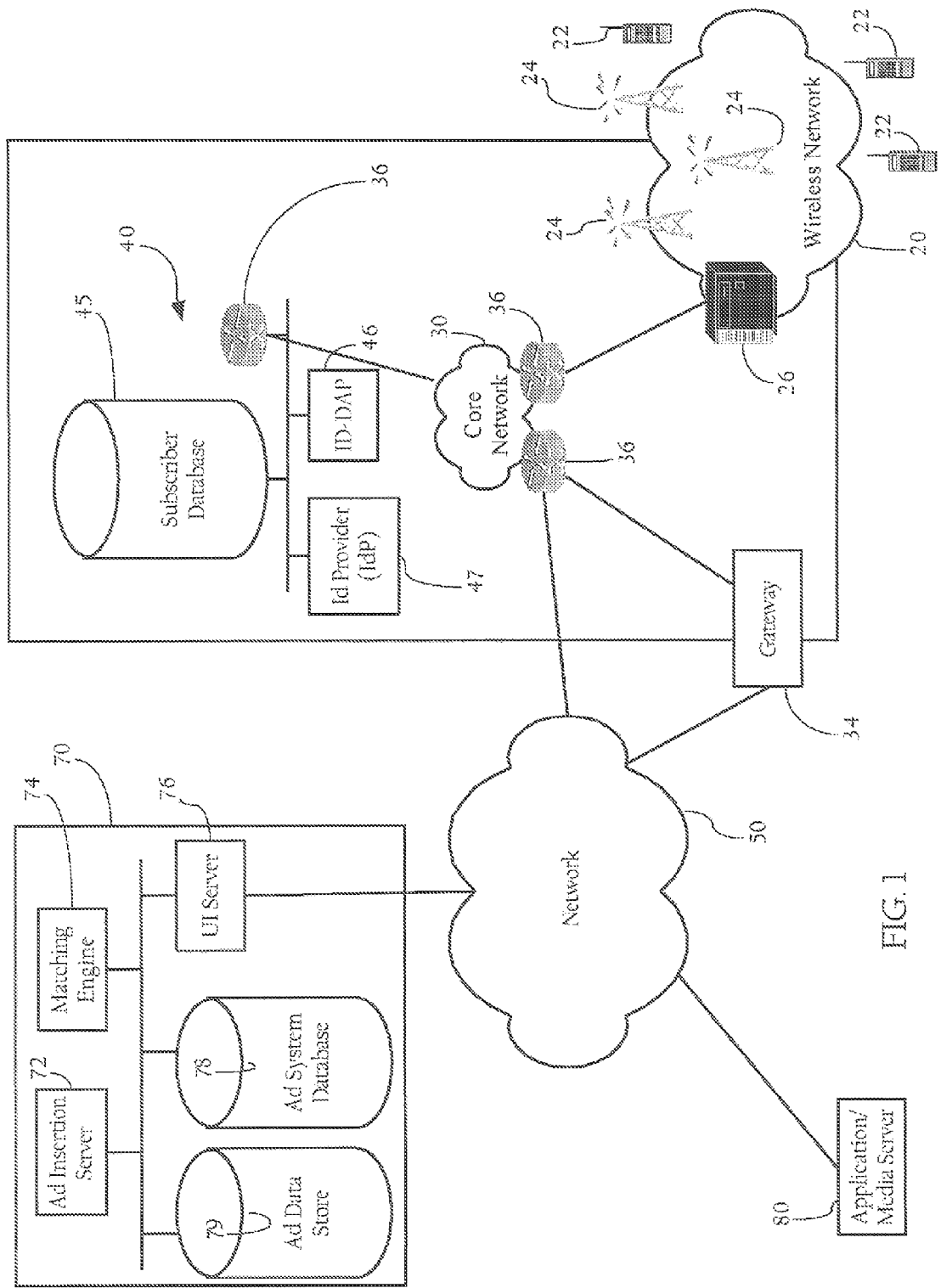
FIG. 1 is a block diagram illustrating a computer network environment in which embodiments of the present invention might operate.
Figure 2:
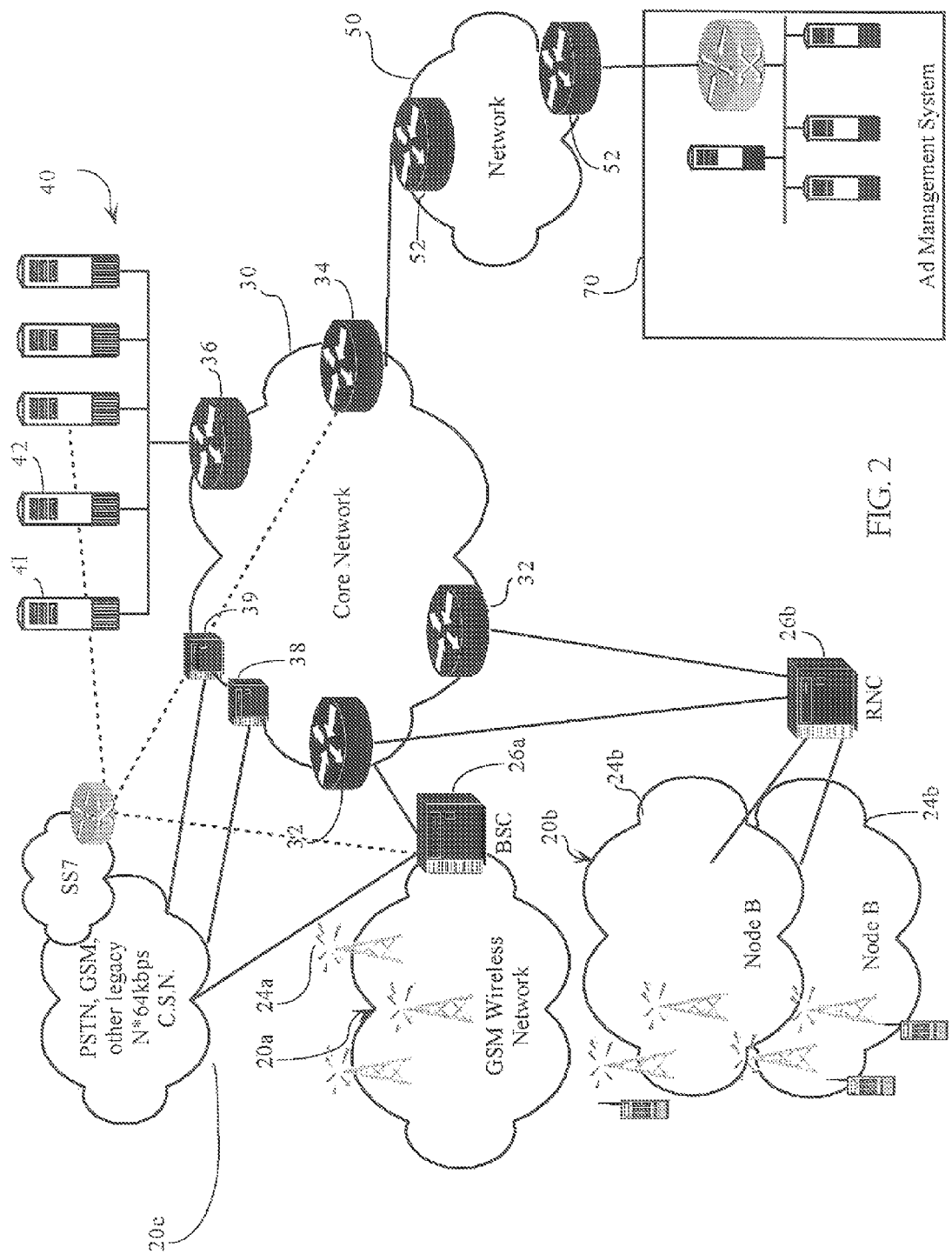
FIG. 2 is a block diagram illustrating additional details of a wireless network in which embodiments of the present invention might operate.
Figure 3:
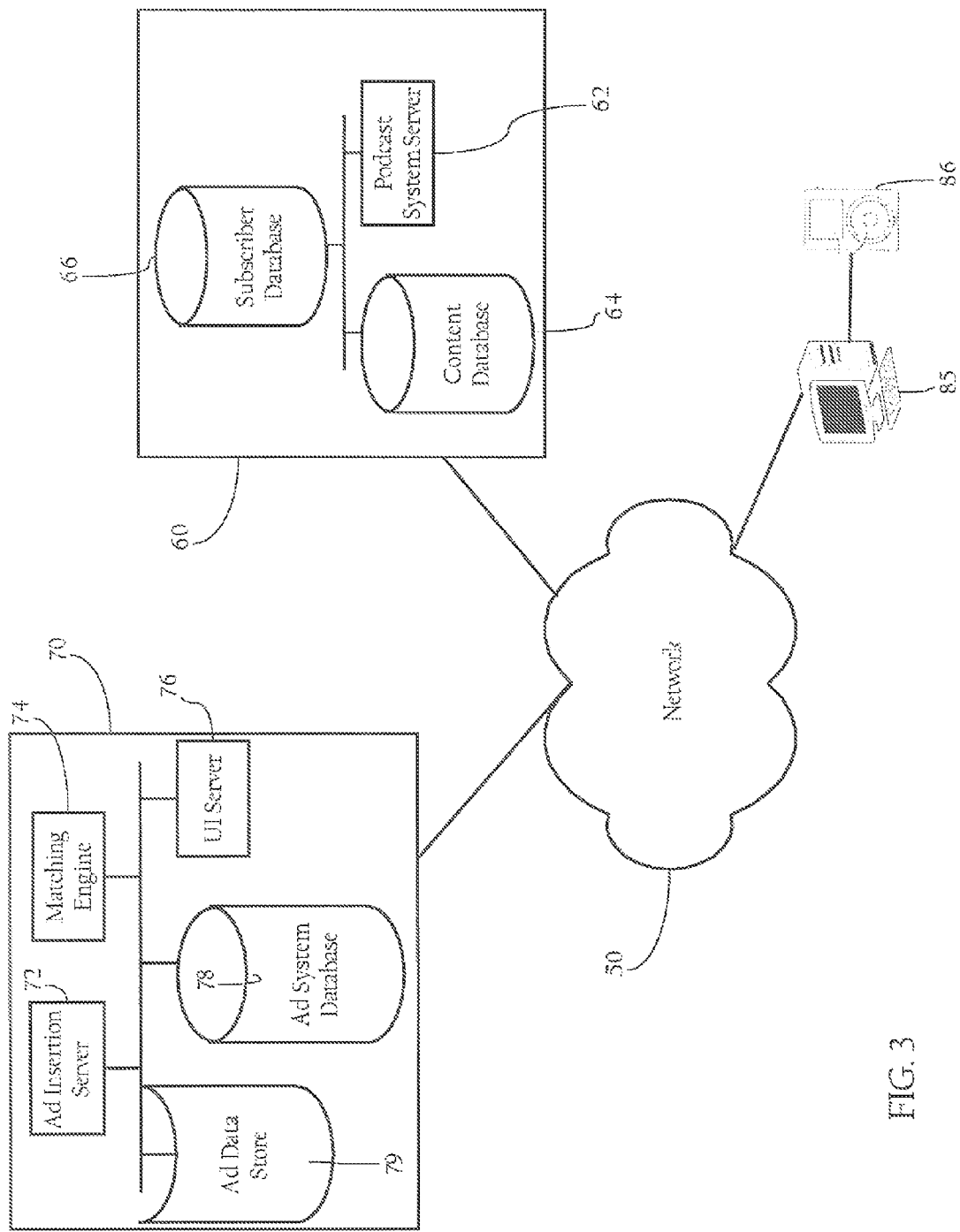
FIG. 3 is a block diagram illustrating another computer network environment in which embodiments of the present invention might operate.

FIG. 1 is a functional block diagram illustrating a network environment in which embodiments of the present invention may operate. Ad management system 70 facilitates creation and deployment of ad campaigns over wireless and/or packet data networks to mobile devices. Mobile devices can be any suitable mobile or portable electronic or computing device. Typically, a mobile device includes one or more processors, a memory, a display and a user interface. The mobile device further includes one or more mechanisms allowing for the exchange of data, such as a wireless network interface, a Bluetooth interface, a serial port, a Universal Serial Bus adapter, and the like. Examples of mobile devices are cellular telephones, wireless email devices, handheld gaming devices, personal digital assistants, and multimedia players (such as the iPod offered by Apple Computer Inc. of Cupertino, Calif.). As FIG. 1 illustrates, in one embodiment, the present invention may operate in connection with one or more wireless networks 20, core network 30, and packet data network 50. Packet data network 50 is a packet-switched network, such as the Internet or an intranet. In one embodiment, external packet data network 50 is an Internet Protocol (IP) network; however, packet data network 50 can employ any suitable network layer and/or routing protocols. As FIG. 2 illustrates, external packet data network 50 includes at least one routing device 52 for the routing of datagrams or packets transmitted between end systems. FIGS. 2 and 3, as discussed below, illustrate additional details and other elements of network environments in which some embodiments of the present invention can be applied.

A.1. Advertising Management System

Ad management system 70 facilitates the deployment of ad campaigns directed to mobile devices over one or more distribution channels. Ad management system 70, in one embodiment, comprises ad insertion server 72, matching engine 74, user interface server 76, ad system database 78, and ad data store 79. Ad insertion server 72 is operative to insert ad content into target content, such as multimedia files and the like. Matching engine 74 is operative to identify one or more ads for insertion into target content. User interface server 76 is operative to provide the communications and user interfaces to the ad management system 70. User interface server 76, in one embodiment, can include HTTP or other server functionality to deliver HTML or web pages in response to requests transmitted by remote hosts.

In other embodiments, user interface server 76 is operative to interact with special-purpose client applications executed on remote hosts. In yet other embodiments, client applications can be embodied in Java Applets and transmitted to remote hosts as part of HTML pages. In other embodiments, the client application functionality can include JSP/J2EE supported web pages, as well as other protocols, such as XML/SOAP technologies. Ad data store 79 stores ad creative content uploaded by remote users. Ad system database 78 stores data relating to the operation of ad management system 70. For example, ad system database 78 may store one or any of the following: user account data, design model data, profile data, content data, content meta data, ad data, ad meta data, and campaign data. The databases described above can be implemented in any suitable manner. In one embodiment, the data described above is stored in a relational database system (e.g., a SQL database), wherein the data described above is maintained in one or more tables in the relational database system. Of course, the data described herein may also be stored in a flat-file database, a hierarchical database, a network database, an object-oriented database, or an object-relational database.

A.2. Wireless Network Architectures

Wireless network 20 enables one or more wireless mobile stations 22 to establish connections with remote devices, such as other mobile stations, POTS telephones, and computing resources (e.g., application or media server 80) on packet data network 50, for the transmission of voice, video, music files, or other data. In one embodiment, wireless network 20 includes at least one base station 24 (or other radio transmit/receive unit) operably connected to a base station controller 26 (e.g., a Base Station Controller (BSC), a Radio Network Controller (RNC), etc.).

The present invention can be deployed in connection with one to a plurality of wireless network types. For example, wireless network 20 may be a cellular or Personal Communication System (PCS) network employing several possible technologies, including Time Division Multiple Access (TDMA), Code Division Multiple Access (CDMA), and Frequency Division Multiple Access (FDMA) communication. Communication of data between mobile stations 22 and gateway 34 can occur over any suitable bearer service. In one embodiment, mobile stations 22 can establish circuit-switched or dial-up connections to a gateway 34 (an interface to external systems or networks, such as a WAP or MMS gateway) associated with the wireless carrier. For example, in GSM networks, Short Message Service (SMS) or Circuit-Switched Data (CSD) bearer services may be used. In addition, mobile stations or terminals 22 may establish packet-switched connections to gateway 34 using General Packet Radio Services (GPRS) bearer services. Other bearer service types may include High-Speed Circuit-Switched Data (HSCSD), Enhanced Data GSM Environment (EDGE). Wireless network 20 can also be a Universal Mobile Telecommunications Service (UMTS) network enabling broadband, packet-based transmission of text, digitized voice, video, and multimedia.

As FIG. 2 illustrates, the present invention can be deployed in an environment involving multiple wireless network types. For example, core network 30 may be operably connected to a GSM network 20a, including one or more base stations 24a and base station controllers 26a. Base station controller 26a may be logically associated with a packet control unit to operate in connection with at least one Serving GPRS Support Node 32 and at least one Gateway GPRS Support Node 34 to provide packet-switched network services. Core network 30 may also support a packet-switched UMTS network 20b comprising one or more Node Bs 24b and at least one radio network controller 26b. Core network 30 may also support circuit-switched wireless networks, such as traditional GSM, PCS or cellular networks 20c.

Accordingly, wireless network 20 may comprise a variety of systems and subsystems. For example, in a GSM network 20a, the wireless network may comprise one or more base transceiver stations 24a operably connected to a base station controller 26a. As FIG. 2 illustrates, the base station controller 26a is connected to core network 30 via a SGSN 32 which handles access control and other tasks associated with GPRS services for mobile stations 22 accessing the network. In GPRS networks, the base station controller 26a may include a packet control unit which operates in connection with at least one SGSN and a GGSN to provide the GPRS service to mobile stations 22. Core network 30 may further include a mobile telephone switching office (MTSO) or mobile switching center (MSC) that connects the landline PSTN system to the wireless network system, and is also responsible for handing off calls from one cell or base station to another. FIG. 2 also illustrates UMTS network 20b comprising one or more node Bs 24b operably connected to a radio network controller 26b. Core network 30 may further include media gateway 38, a switching device that terminates circuit-switched channels from a wireless network 20c and connections from packet-switched, core network 30, that supports access to voice and data services for other wireless network types.

Core network 30 includes functionality supporting operation of the wireless network 20, as well as functionality integrating circuit- and packet-switched network traffic. In one embodiment, core network 30 comprises at least one routing device, such as router 36, to route data packets between nodes connected to the core network 30. As discussed above, in one embodiment, core network 30 includes at least one Gateway GPRS Support Node (GGSN) 34, and at least one Serving GPRS Support Node (SGSN) 32. The Gateway GPRS Support Node 34 supports the edge routing function of the core network 30. To external packet data networks, such as network 50, the GGSN 34 performs the task of an IP router. In one embodiment, the GGSN 34 also includes firewall and filtering functionality, to protect the integrity of the core network 30. The SGSN 32, in one embodiment, connects a base station controller 24 to core network 32. The SGSN 32, in one embodiment, keeps track of the location of an individual mobile station 22 and performs security functions and access control. Of course, one of ordinary skill in the art will recognize that the systems employed within, and the functionality of, core network 30 depend on the wireless network type(s) that it supports.

In one embodiment, a router 36 interconnects cellular operator server farm 40 to core network 30. Cellular operator server farm 40 includes at least one server or other computing device implementing functionality associated with, enabling, and/or facilitating operation of wireless network 20. For example, cellular operator server farm 40, in one embodiment, comprises signaling gateway 41, and Home Location Register (HLR) 42. Operator server farm 40 may further include a Visitor Location Register (VLR), DNS servers, WAP gateways, email servers and the like.

As FIG. 1 shows, in one embodiment, cellular operator server farm 40 includes subscriber database 45, and identity access management functionality, such as Identity Based Directory Access Protocol (ID-DAP) server 46 and an identity provider 47. Identity provider 47 is operative to authenticate and assert a user's identity.

Mobile stations 22, in one embodiment, include browser client functionality, such as micro-browsers operative to receive data and files directly from servers, such as application or media server 80 indirectly via a WAP gateway or other proxy. As discussed above, a variety of circuit-switched or packet-switched bearer services can be employed to connect mobile stations 22 to WAP gateway. For example, mobile stations 22 may be configured to establish a dial-up connection. In one embodiment, mobile station 22 is a smart phone providing digital voice service as well as web access, via a micro-browser. Mobile station 22 may also be a wireless personal digital assistant including a micro-browser. The micro-browser may comply with one to a combination of wireless access protocols, such as WAP, HDML, i-mode, cHTML and variants of any of the foregoing. In one embodiment, at least one mobile station 22 may include functionality supporting SMS and/or MMS messaging. In yet another embodiment, the mobile station 22 may include a special-purpose client that is configured to interact directly with application server 80, as opposed to a general purpose micro-browser. In one embodiment, the mobile station 22 may include a media player, a gaming application, or other client-side application.

A.3. Network Architecture for Podcasting System

FIG. 3 illustrates another network-based environment in which the present invention may be applied. FIG. 3 shows podcast system 60 comprising a podcast system server 62, a subscriber database 66, and a content database 64. Podcast system 60 includes functionality directed to publishing multimedia files (sound and/or video files) to the Internet, and allowing users to subscribe to one or more feeds and receive new files automatically by subscription. Podcast system 60 may also allow for simple download or real-time streaming of multimedia files, as well.

Subscribing to podcasts allows a user to collect programs from a variety of sources for listening or viewing either online or off-line through a portable device, as desired. Using known software tools—such as Apple iTunes software, podcast-enabled RSS readers, web browsers, etc.—podcasts or other multimedia files downloaded to computer 70 can then be synchronized to a portable multimedia device 72, such as an MP3 player, for off-line listening. The publish/subscribe model of podcasting is a version of push technology, in that the information provider chooses which files to offer in a feed and the subscriber chooses among available feed channels.

Podcasting technologies can involve automatic mechanisms by which multimedia computer files are transferred from a server to a client which pulls down XML files containing the Internet addresses of the media files. In general, these files contain audio or video, but also could be images, text, PDF, or any file type. The content provider posts the feed to a known location on a web server, such as podcast system server 62. This location is known as the feed URI (or, perhaps more often, feed URL). A user enters this feed URI into a software program called a podcatcher, podcast reader, or aggregator executed on computer 70. This program retrieves and processes data from the feed URI. A podcatcher can be an always-on program which starts when the computer is started and runs in the background. It manages a set of feed URIs added by the user and downloads each at a specified interval, such as every two hours. If the feed data has substantively changed from when it was previously checked (or if the feed was just added to the podcatcher's list), the program determines the location of the most recent item and automatically downloads it to the user's computer 70. Some podcatchers, such as iTunes, also automatically make the newly downloaded episodes available to a user's portable media player. The downloaded episodes can then be played, replayed, or archived as with any other computer file.

B. System Architecture for Insertion Server

Figure 4:
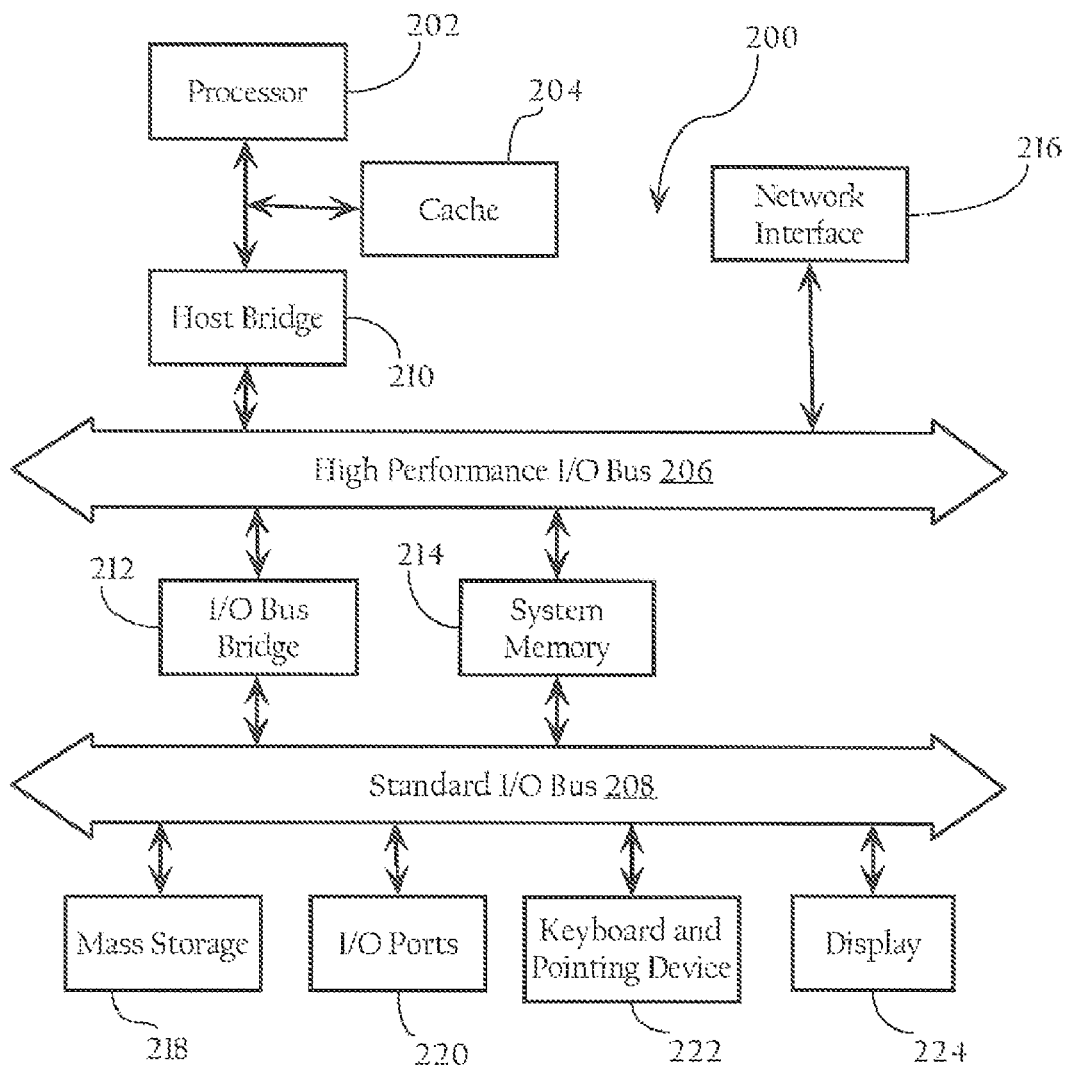
FIG. 4 is a block diagram showing the high-level system architecture for an insertion server, which server might be used with one embodiment of the present invention.

FIG. 4 illustrates, for didactic purposes, a hardware system 200, which may be used as an insertion server. In one embodiment, hardware system 200 comprises a processor 202, a cache memory 204, and one or more software applications and drivers directed to the functions described herein. Additionally, hardware system 200 includes a high performance input/output (I/O) bus 206 and a standard I/O bus 208. A host bridge 210 couples processor 202 to high performance I/O bus 206, whereas I/O bus bridge 212 couples the two buses 206 and 208 to each other. A system memory 214 and a network/communication interface 216 couple to bus 206. Hardware system 200 may further include video memory (not shown) and a display device coupled to the video memory. Mass storage 218 and I/O ports 220 couple to bus 208. In one embodiment, hardware system 200 may also include a keyboard and pointing device 222 and a display 224 coupled to bus 208. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 200 are described in greater detail below. In particular, network interface 216 provides communication between hardware system 200 and any of a wide range of networks, such as an Ethernet (e.g., IEEE 802.3) network, etc. Mass storage 218 provides permanent storage for the data and programming instructions to perform the above described functions implemented in the RF coverage map generator, whereas system memory 214 (e.g., DRAM) provides temporary storage for the data and programming instructions when executed by processor 202. I/O ports 220 are one or more serial and/or parallel communication ports that provide communication between additional peripheral devices, which may be coupled to hardware system 200.

Hardware system 200 may include a variety of system architectures; and various components of hardware system 200 may be rearranged. For example, cache 204 may be on-chip with processor 202. Alternatively, cache 204 and processor 202 may be packed together as a "processor module," with processor 202 being referred to as the "processor core." Furthermore, certain embodiments of the present invention may not require nor include all of the above components. For example, the peripheral devices shown coupled to standard I/O bus 208 may couple to high performance I/O bus 206. In addition, in some embodiments only a single bus may exist with the components of hardware system 200 being coupled to the single bus. Furthermore, hardware system 200 may include additional components, such as additional processors, storage devices, or memories.

In particular embodiments, the processes described herein are implemented as a series of software routines run by hardware system 200. These software routines comprise a plurality or series of instructions to be executed by a processor in a hardware system, such as processor 202. Initially, the series of instructions are stored on a storage device, such as mass storage 218. However, the series of instructions can be stored on any suitable storage medium, such as a diskette, CD-ROM, ROM, EEPROM, etc. Furthermore, the series of instructions need not be stored locally, and could be received from a remote storage device, such as a server on a network, via network/communication interface 216. The instructions are copied from the storage device, such as mass storage 218, into memory 214 and then accessed and executed by processor 202.

An operating system manages and controls the operation of hardware system 200, including the input and output of data to and from software applications (not shown). The operating system provides an interface between the software applications being executed on the system and the hardware components of the system. According to one embodiment of the present invention, the operating system is the LINUX operating system. However, the present invention may be used with other suitable operating systems, such as the Windows® 95/98/NT/XP operating system, available from Microsoft Corporation of Redmond, Wash., the Apple Macintosh Operating System, available from Apple Computer Inc. of Cupertino, Calif., UNIX operating systems, and the like.

C. Processes for Inserting Media

A scalable system has been developed that supports the dynamic insertion of advertisements into media communicated to remote hosts, such as mobile devices and media players, as well as other computing systems. In particular embodiments, this system employs an insertion server, as described above, to perform this dynamic insertion. In turn, such an insertion server might employ the processes described below. Some embodiments of this system use pre-normalized media content to avoid transcoding, and concurrent media streams to avoid the use of large amounts of temporary or intermediate storage.

With regard to pre-normalized media, particular embodiments require that ads be encoded in a format compatible with the targeted content. For instance, if an ad is targeted for insertion into a video podcast, then the system might required the ad to be encoded using the H.264 video codec, the AAC audio codec, and a frame rate of 15 fps. In other implementations, the system itself may transcode the media after a user uploads it. Further, when the target content comes in a variety of formats, some embodiments might require that the ads be available in each of the target formats. Such availability can be achieved by pre-transcoding the ad into each of the target formats, using a high-quality source file.

The use of a high-quality source file lessens the degradation resulting from lossy codecs. Pre-transcoding the ad allows the transcoding to take place long before any user requests are made for the content, thereby avoiding any delays in the delivery of content with the inserted ad. Moreover, ads are typically much shorter than the target content and therefore require many fewer resources to transcode in comparison with the resources which would be required to transcode both the ad and content together at insertion time.

In addition to pre-normalizing with respect to compatibility, particular embodiments of the system might require pre-normalizing with respect to sequence. For example, some container file formats do not require that their media samples to be in a linear sequence, though such a sequence might be easier and faster to process. As part of the pre-normalizing process, an embodiment of the system might require the creation of a linear sequence of media samples. Since pre-normalizing is non-real-time, it does not detract from performance of the system. Other embodiments require pre-normalizing with respect to compatibility, but not with respect to sequence.

Figure 5:
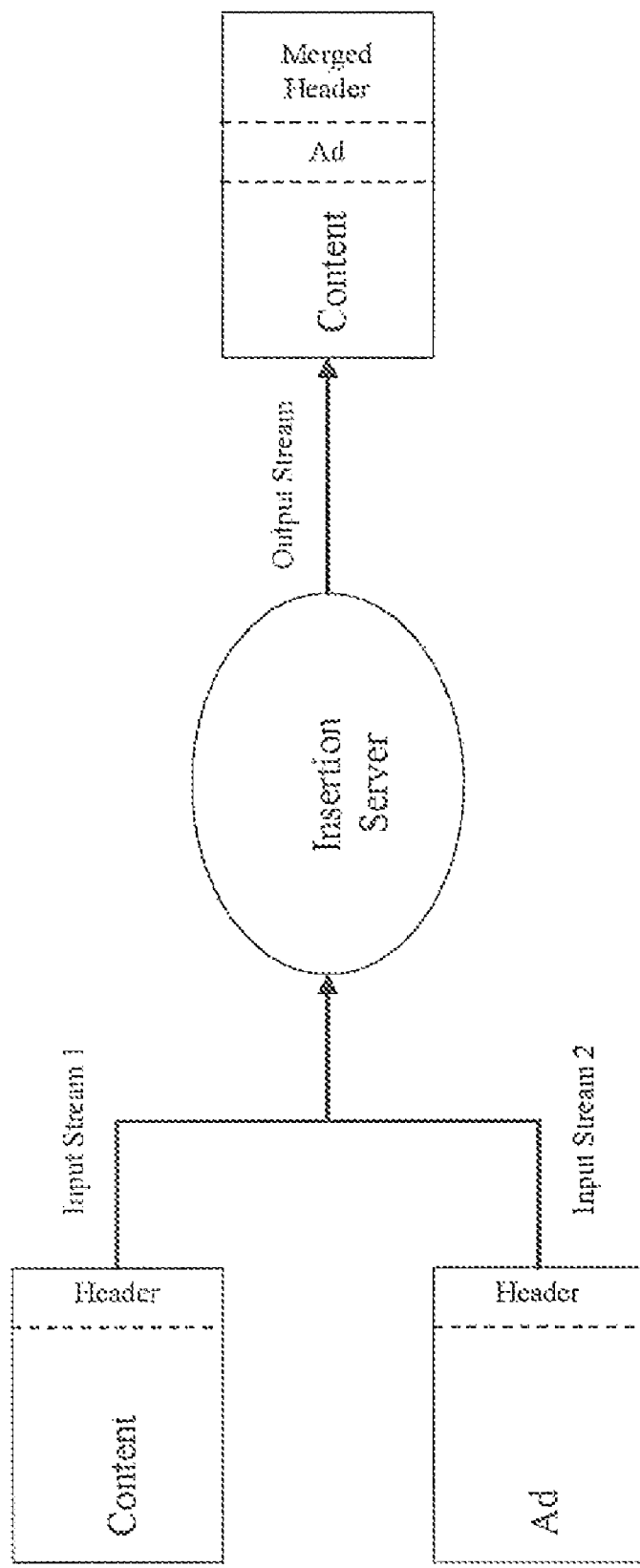
FIG. 5 is a diagram showing a generalized process which might be used by an insertion server to insert an ad stream into a content stream.

With regard to concurrent media streams, it will be appreciated that (a) audio and video files tend to be large relative to text documents or images but (b) insertion of such files should not use large amounts of temporary storage space, since the use of such storage scales poorly to handle a high volume of content requests. Therefore, in some embodiments of the system, the insertion server might manage input and output streams concurrently as shown in FIG. 5, where at a general level, the insertion process proceeds as follows: (i) open Input Stream 1 and read the header; (ii) open Input Stream 2 and read the header; (iii) write the merged header to the Output Stream; (iv) pipe the media data from Input Stream 2 to the Output Stream; and (v) pipe the media data from Input Stream 1 to the Output Stream.

In this generalized process, the input and output data sources might not be files on a local system. They might be network connections reading from media servers and writing to a remote client. Since the input and output streams are being read/written at the same time, the process does not need to create a temporary output file or use other temporary output storage. Further, the amount of memory required to complete this process is relative to the size of the headers, each of which tend to be extremely small relative to the media file size.

Further, the generalized process in FIG. 5 could be easily changed to work with more than two input sources in order to insert multiple ads. In this regard, see FIG. 9 below. Similarly, this generalized process could be easily changed to allow the insertion of the ad into any position in the output stream, rather than at the beginning (or end) of the content.

Figure 6:
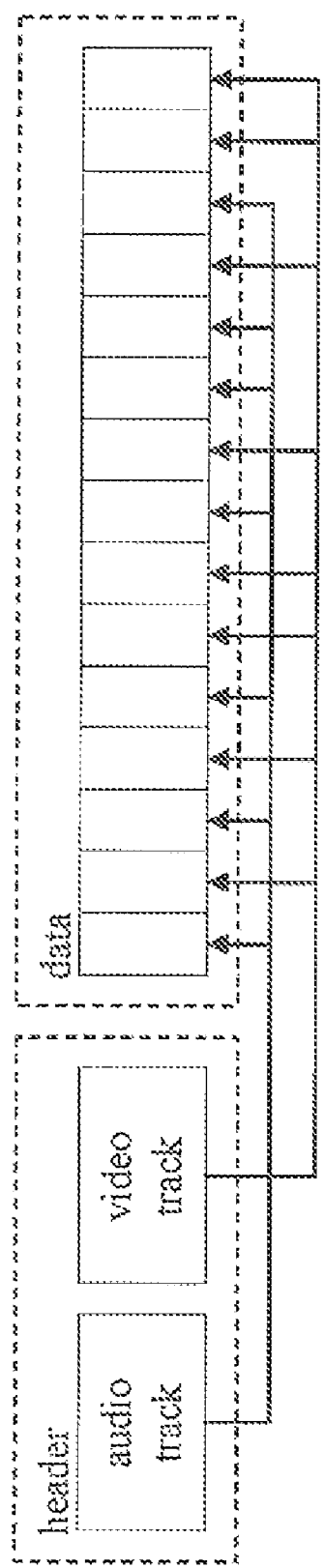
FIG. 6 is a diagram showing a generalized container file format.

While the above generalized process might be applied to various media file formats, the MP4 format facilitates the process due to the fact that it is a container format. FIG. 6 shows a simplified view of a container format file, such as an MP4 file. In FIG. 6, the file might contain one or more tracks, such as an audio track and a video track, where each track has a header which describes the track in greater detail, e.g., its duration, encoding, playback rate, etc.

Further each track includes a table of pointers into the data portion of the file. The data items to which the pointers point are called chunks. There is no required ordering for the chunks, but it is often the case that audio and video information is interlaced from beginning to end to allow the media to be played while the file is being read sequentially.

Figure 7:
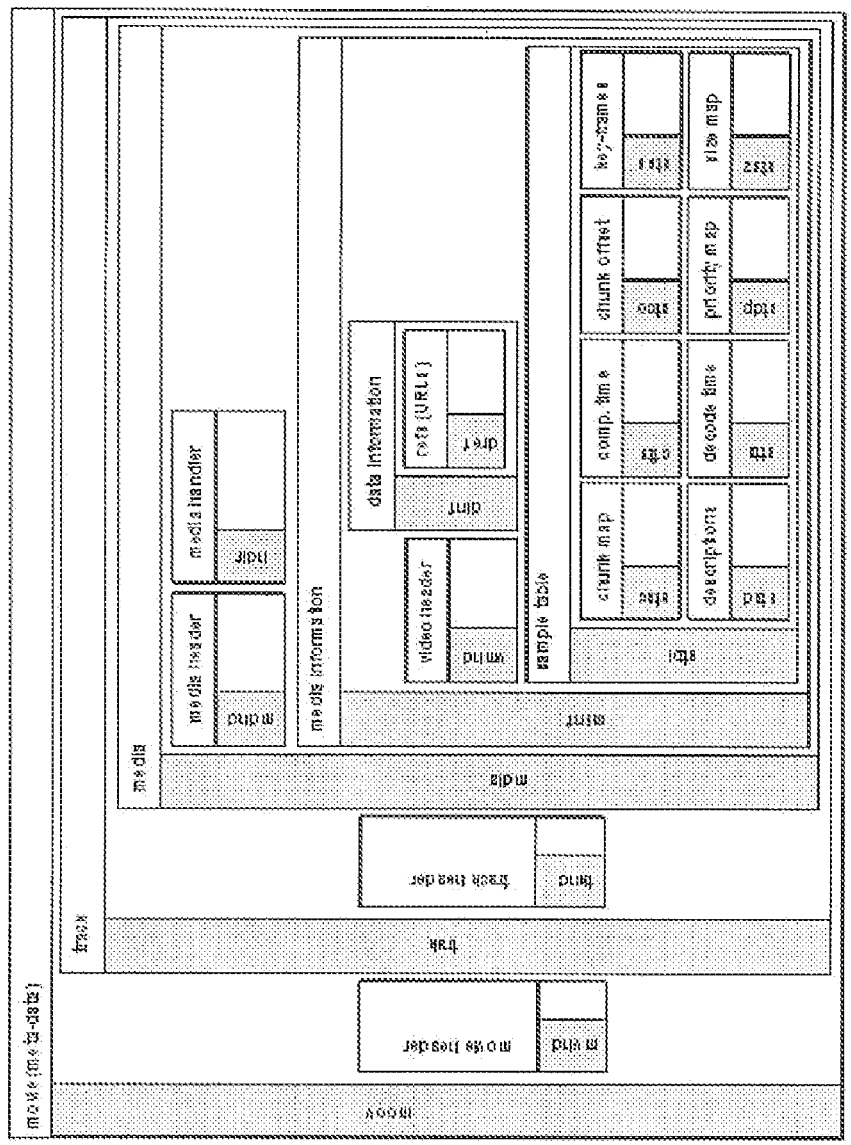
FIG. 7 is a diagram showing an example MP4 container-format file.

FIG. 7 shows an example MP4 container-format file from the MPEG-4 Overview—(V.21—Jeju Version). As shown in this figure, an MP4 container-file includes a header for a movie and a track. In turn, the track includes its own header and a media information container (not to be confused with the "mdat" or media data container best shown in FIG. 11), which container in turn includes its own header and a media information, which in turn includes a sample table. All of the headers in the MP4 container format include encoded structural information within the header's scope. Thus, the header for the movie contains structural information for the movie, the header for each of the movie's tracks contains structural information for the track, and the header for each track's media contains structural information for the media, etc.

The sample table is the counterpart to the table of pointers into the data portion of the file, shown in FIG. 6. Each entry in a sample table specifies the location and duration of a chunk of sample data, such as a still image, a video frame, a sequence of PCM audio samples, or a text string. There is at least one sample description for each table of samples. The sample description provides the details necessary to translate a stored sample into a format that a media handler can work with. For example, a sample description might specify the height, width, and pixel format of an image, or the sample size and sampling rate of a group of PCM audio samples.

Not shown in FIG. 7 is the track's edit list, which allows one to alter or reorder the display of data samples without changing or rearranging the samples themselves (i.e., it enables nondestructive editing). Using an edit list, one can "edit out" a track segment without deleting any samples from the data source, or repeat a segment without increasing the size of the data source with duplicate samples. In other words, any segment of media time, including an empty segment, can be mapped to any segment of track time. If a track has not been edited, the edit list is empty and the track is treated as a single segment, with all the media samples played in the order they are stored, at the natural time scale for the media sample data. See the QuickTime Overview (Apple, 2005 Aug. 11).

Figure 8:
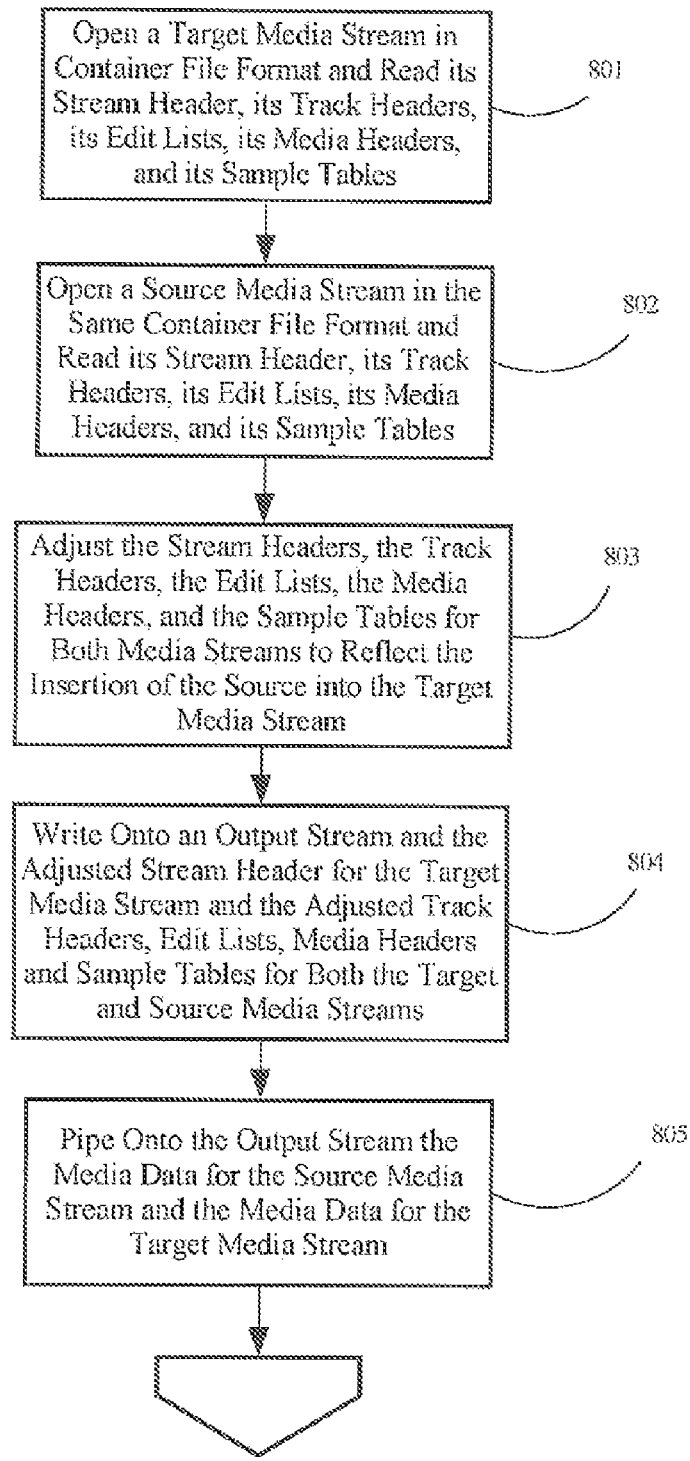
FIG. 8 is a diagram showing a flowchart of a process to insert a source media stream into a target media stream, which process might be used with an embodiment of the present invention.

FIG. 8 shows a flowchart of a process to insert a source media stream into a target media stream, which process might be used in particular embodiments. In the first step 801, the process opens a target media stream (in a container file format such as MP4) and reads its stream header, its track headers, its edit lists, its media headers, and its sample tables. In some embodiments, the target media stream will contain content. In step 802, the process opens a source media stream in the same container file format and reads its stream header, its track headers, its edit lists, its media headers, and its sample tables. In some embodiments, the source media stream will contain an ad. In step 803, the process adjusts the stream headers, the track headers, the edit lists, the media headers, and the sample tables for both media streams to reflect the insertion of the source media stream into the target media stream. In step 804, the process writes onto an output stream (e.g., a stream associated with a network socket) the adjusted stream header for the target media stream and the adjusted track headers, its edit lists, its media headers, and its sample tables for both the target and the source media streams. Then in step 805, the process pipes onto the output stream the media data for the source media stream and the media data for the target media stream.

Figure 9:
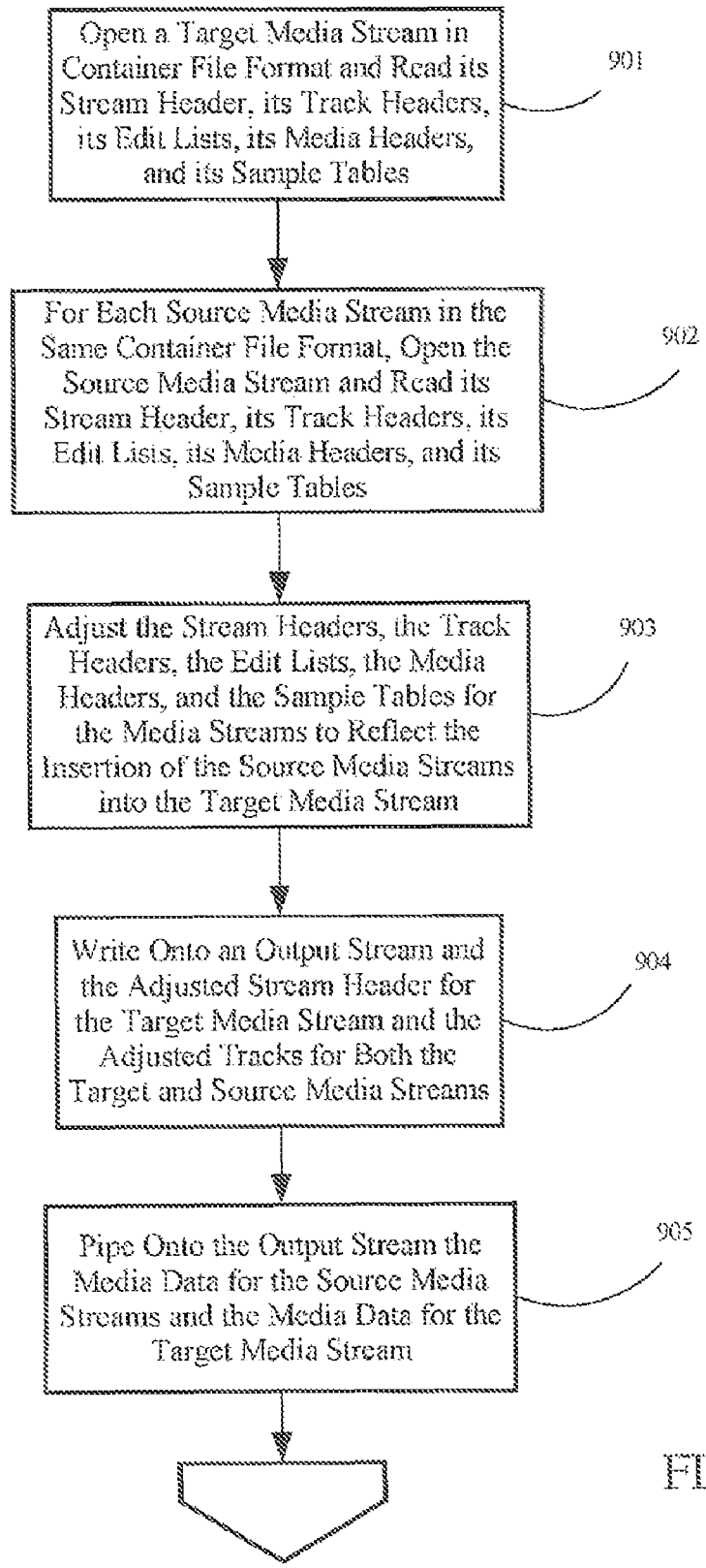
FIG. 9 is a diagram showing a flowchart of a process for inserting multiple media streams into a target stream, which process might be used with an embodiment of the present invention.

FIG. 9 shows a flowchart of a process for inserting multiple media streams into a target stream, which process might be used in particular embodiments. The process builds upon the process shown in FIG. 8. Specifically, in the first step 901, the process opens a target media stream in a container file format and reads its stream header, its track headers, its edit lists, its media headers, and its sample tables. In step 902, the process creates an iteration over a collection of source media streams in the same container file format, opening each source media stream and reading its stream header, its track headers, its edit lists, its media headers, and its sample tables. In step 903, the process adjusts the stream headers, the track headers, the edit lists, the media headers, and the sample tables for all of the media streams to reflect the insertion of the source media streams into the target media stream. In step 904, the process writes onto an output stream the adjusted stream header for the target media stream and the adjusted tracks for the target media stream and all of the source media streams. Then in step 905, the process pipes onto the output stream the media data for the source media streams and the media data for the target media stream.

As noted in steps 805 and 905, the process pipes onto an output stream the media data from the source and target media streams. Particular embodiments implement this piping step with file channels that operate on temporary copies of the source and target media streams stored on the insertion server. File channels are a part of the so-called "new I/O" APIs (application programming interfaces) provided by the Java programming language. In the new I/O APIs, a file channel can establish a buffer directly mapped to file contents using memory-mapped I/O. See generally, the section on New I/O in the Java Platform Standard Edition 5.0 Development Kit (JDK 5.0) Documentation (Sun Microsystems, 2004).

Figure 10:
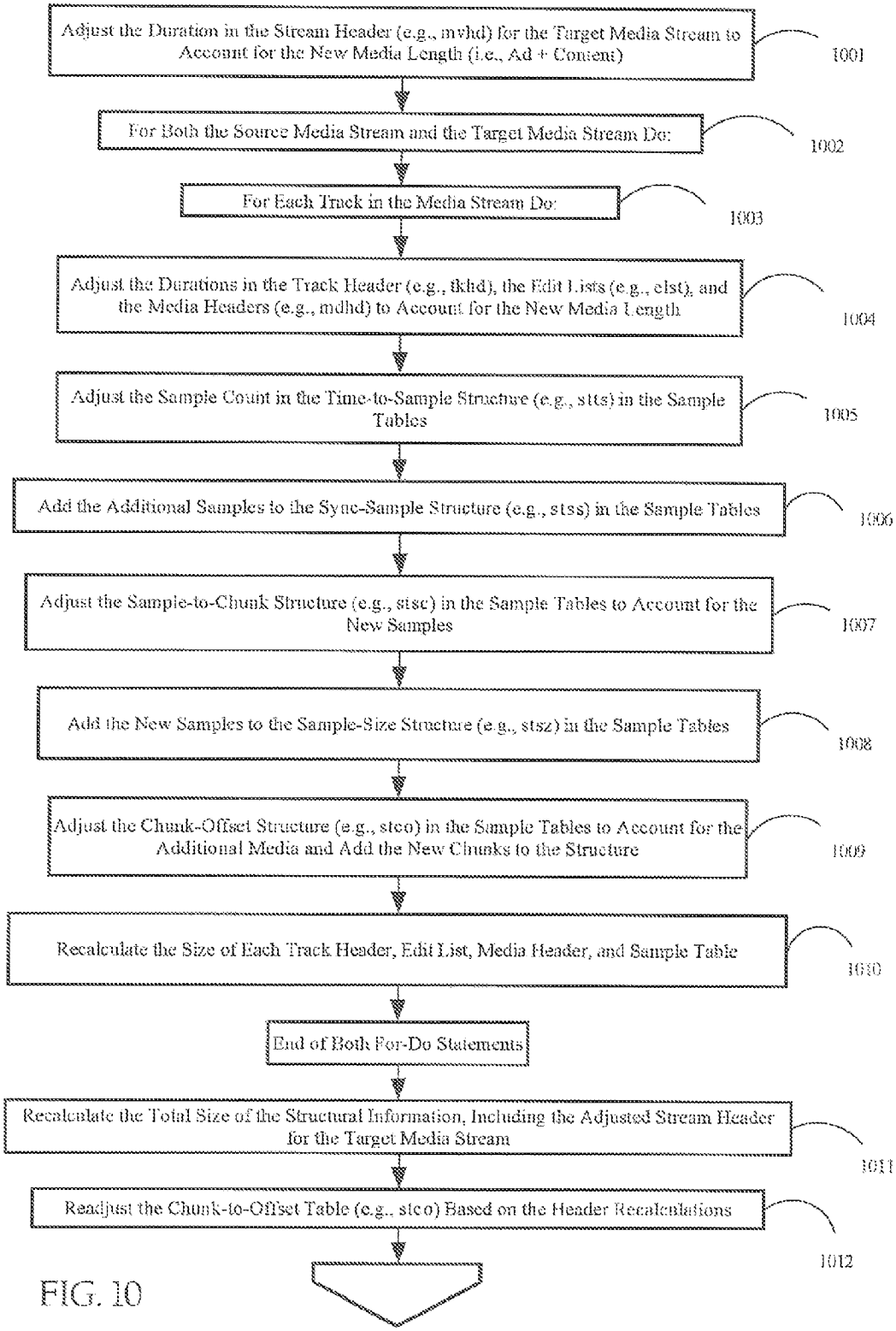
FIG. 10 is a diagram showing a flowchart of a process for adjusting the headers of an output media stream resulting from insertion of a source media stream into a target media stream, which process might be used with an embodiment of the present invention.

FIG. 10 shows a flowchart which might be used in some embodiments to perform the adjustments referred to above in step 803 and in step 903. The adjustments refer to example structures in the MP4 container file format, which structures are atom (or box) types registered with the MP4 Registration Authority. Here a "type" consists of a size and a four-character code. So for example, "stbl" is a registered atom type for a "sample table".

Further in this regard, FIG. 11 shows a table from ISO/IEC 14496-12:2005(E) (Corrected Version, 2005 Oct. 1), the specification for the ISO base media file format which forms the basis for the MP4 container file format. The table provides descriptions of the atom (or box) types that are used in particular embodiments of the invention and shows the relationship between the types by way of an indentation hierarchy.

Returning to FIG. 10, the first step 1001 of the process adjusts the duration in the stream header (e.g., mvhd) for the target media stream to account for the new media length (i.e., ad plus content). In the second step and third steps, 1002 and 1003, the process launches nested for-loops that will iterate over each track in both the target media stream and the source media stream. In step 1004, the process adjusts the durations in the track header (e.g., tkhd), the edit lists (e.g., elst), and the media headers (e.g., mdhd) to account for the new media length. Then in step 1005, the process adjusts the sample count in the time-to-sample structure (e.g., stts) in the sample tables. In step 1006, the process adds the additional samples to the sync-sample structure (e.g., stss) in the sample tables. And in step 1007, the process adjusts the sample-to-chunk structure (e.g., stsc) in the sample tables to account for the new samples. In step 1008, the process adds the new samples to the sample size structure (e.g., stsz) in the sample tables. Then in step 1009, the process adjusts the chunk offset structure (e.g., stco) in the sample tables to account for the additional media and adds the new chunks to the structure. In step 1010, the process recalculates the size of each track header, edit list, media header, and sample table, before both for-loops end. And in step 1011, the process recalculates the total size of all the structural information, including the adjusted stream header for the target media stream. Then in step 1012, the process readjusts the chunk-to-offset table based on the header recalculations.

As described above, particular embodiments of the insertion process might be comprised of instructions that are stored on storage media. The instructions might be retrieved and executed by a processing system. The instructions are operational when executed by the processing system to direct the processing system to operate in accord with the present invention. Some examples of instructions are software, program code, firmware, and microcode. Some examples of storage media are memory devices, tape, disks, integrated circuits, and servers. The term "processing system" refers to a single processing device or a group of inter-operational processing devices. Some examples of processing devices are integrated circuits and logic circuitry. Those skilled in the art are familiar with instructions, storage media, and processing systems.

Those skilled in the art will appreciate variations of the above-described embodiment that fall within the scope of the invention. In this regard, it will be appreciated that there are many other possible orderings of the steps in the processes described above and many possible modularizations of those orderings. And it will be appreciated that the processes are equally applicable when a media stream has tracks in addition to a video track and an audio track.

Further, it will be appreciated that there are other file formats besides MP4, to which the described insertion process might be applied, including other container file formats. Some examples of other container file formats: QuickTime (the standard Apple container, on which MP4 is based), IFF (first platform independent container format), AVI (the standard Microsoft Windows container, also based on RIFF), MOV (standard QuickTime container), Ogg (standard container for Xiph.org codecs), ASF (standard container for Microsoft WMA and WMV), RealMedia (standard container for RealVideo and RealAudio), Matroska (not standard for any codec or system, but it is an open standard), 3gp (used by many mobile phones), and all file format that use the ISO base media file format. As a result, the invention is not limited to the specific examples and illustrations discussed above, but only by the following claims and their equivalents.

What is claimed is:

1. A method, comprising:
receiving a first media stream formatted into a first container file format and encoded using a first codec, the first media stream comprising a first stream header and one or more first tracks, each first track comprising a first track header, one or more first edit lists, and one or more first media, each first media comprising a first media header and one or more first sample tables specifying locations and durations of sample data within the first media stream;
receiving a second media stream formatted into the first container file format and encoded using the first codec, the second media stream comprising a second stream header and one or more second tracks, each second track comprising a second track header, one or more second edit lists, and one or more second media, each second media comprising a second media header and one or more second sample tables specifying locations and durations of sample data within the second media stream;

reading the first stream header, the first track headers, the first edit lists, the first media headers, and the first sample tables;

reading the second stream header, the second track headers, the second edit lists, the second media headers, and the second sample tables;

adjusting one or more of the first stream header, the second stream header, the first track headers, the second track headers, the first edit lists, the second edit lists, the first media headers, the second media headers, the first sample tables, and the second sample tables in the first and second media streams in order to effect the insertion of the first media stream into the second media stream without removing any content of the second media stream;

writing onto an output media stream the adjusted first and second media streams; and piping onto the output media stream media data of the first and second adjusted media streams, wherein piping onto the output media stream media data of the first and second media streams comprises utilizing file channels that operate on temporary copies of the first and second media streams, wherein each file channel is operative to establish a buffer directly mapped to file contents in the first and second media streams using memory-mapped I/O.

2. A method as in claim 1, further comprising prenormalizing one or more of the first media stream and the second media stream prior to the adjusting.

3. A method as in claim 2, wherein prenormalizing comprises transcoding one or more of the first and second media streams into common compatible format.

4. A method as in claim 2, wherein prenormalizing comprises, for one or more of the first and second media streams, resequencing media samples in the stream to generate a linear sequence of media samples.

5. A method as in claim 1, wherein the method is performed by an insertion server.

6. A method as in claim 1, wherein the first media stream comprises an advertisement and the second media stream comprises content.

7. A method as in claim 1, wherein the first container file format is an MP4 file format.

8. A method as in claim 1, wherein writing onto the output media stream is concurrent with one or more of receiving the first media stream and receiving the second media stream.

9. A method as in claim 1, wherein the output media stream is transmitted to a mobile device for consumption by the mobile device.

10. A method as in claim 1, wherein adjusting one or more of the first stream header, the second stream header, the first track headers, the second track headers, the first edit lists, the second edit lists, the first media headers, the second media headers, the first sample tables, and the second sample tables in the first and second media streams in order to effect the insertion of the first media stream into the second media stream comprises one or more of:

adjusting the duration in the second stream header to be a sum of an original duration of the first media stream and an original duration of the second media stream;

launching a nested for-loop that iterates over each first track in the first media stream;

launching a nested for-loop that iterates over each second track in the second media stream;

adjusting the duration in each of one or more of the first track headers, the second track headers, the first edit lists, the second edit lists, the first media headers, the second media headers to account for the new media length;

adjusting the sample count in the time-to-sample structure in one or more of the first and second sample tables;

adding additional samples to the sync-sample structure in one or more of the first and second sample tables;

adjusting the sample-to-chunk structure in one or more of the first and second sample tables to account for the additional samples;

adding the additional samples to the sample size structure in one or more of the first and second sample tables;

adjusting the chunk offset structure in one or more of the first and second sample tables to account for the additional samples and adding the new chunks to the structure;

recalculating the size of each of one or more of the first track headers, second track headers, first edit lists, second edit lists, first media headers, second media headers, first sample tables, and second sample tables before the first or second nested for-loops end;

recalculating a total size of all of the first stream header, the second stream header, the first track headers, the second track headers, the first edit lists, the second edit lists, the first media headers, the second media headers, the first sample tables, and the second sample tables; and readjusting a chunk-to-offset table based on the recalculation of the total size.

11. The method of claim 1, wherein:

the first stream header, the first track headers, the first media headers, the second stream header, the second track headers, and the second media headers are adjusted and written to a temporary memory and then written to the output media stream; and the media data of the first media stream and the second media stream are directly piped onto the output media stream without using any temporary memory.

12. The method of claim 1, wherein piping onto the output media stream media data of the first and second adjusted media streams comprises:

concurrently reading the media data from the first adjusted media stream and the second adjusted media stream and writing the media data to the output media stream so that no temporary output storage is used while piping onto the output media stream the media data of the first and second adjusted media streams.

13. An apparatus, comprising logic encoded in one or more persistent storage media for execution and when executed operable to:

receive a first media stream formatted into a first container file format and encoded using a first codec, the first media stream comprising a first stream header and one or more first tracks, each first track comprising a first track header, one or more first edit lists, and one or more first media, each first media comprising a first media header and one or more first sample tables specifying locations and durations of sample data within the first media stream;

receive a second media stream formatted into the first container file format and encoded using the first codec, the second media stream comprising a second stream header and one or more second tracks, each second track comprising a second track header, one or more second edit lists, and one or more second media, each second media comprising a second media header and one or more second sample tables specifying locations and durations of sample data within the second media stream;

read the first stream header, the first track headers, the first edit lists, the first media headers, and the first sample tables;

read the second stream header, the second track headers, the second edit lists, the second media headers, and the second sample tables;

adjust one or more of the first stream header, the second stream header, the first track headers, the second track headers, the first edit lists, the second edit lists, the first media headers, the second media headers, the first sample tables, and the second sample tables in both streams in order to effect the insertion of the first media stream into the second media stream without removing any content of the second media stream;

write onto an output media stream the adjusted first and second streams; and pipe onto the output media stream media data of the first and second adjusted media streams, wherein the logic operable to pipe onto the output media stream media data of the first and second media streams comprises logic operable to utilize file channels that operate on temporary copies of the first and second media streams, wherein each file channel is operative to establish a buffer directly mapped to file contents in the first and second media streams using memory-mapped I/O.

14. An apparatus as in claim 13, wherein the logic is further operable to prenormalize one or more of the first media stream and the second media stream.

15. An apparatus as in claim 13, wherein the encoded logic is executed by an insertion server.

16. An apparatus as in claim 13, wherein the first media stream comprises an advertisement and the second media stream comprises content.

17. An apparatus as in claim 13, wherein the first container file format is an MP4 file format.

18. An apparatus as in claim 13, wherein the logic operable to write onto the output media stream, receive the first media stream, and receive the second media stream is operable to write onto the output media stream concurrently with one or more of receiving the first media stream and receiving the second media stream.

19. An apparatus as in claim 13, wherein the logic operable to adjust one or more of the first stream header, the second stream header, the first track headers, the second track headers, the first edit lists, the second edit lists, the first media headers, the second media headers, the first sample tables, and the second sample tables in the first and second media streams in order to effect the insertion of the first media stream into the second media stream comprises logic operable to perform one or more of:

adjust the duration in the second stream header to be a sum of an original duration of the first media stream and an original duration of the second media stream;

launch a nested for-loop that iterates over each first track in the first media stream;

launch a nested for-loop that iterates over each second track in the second media stream;

adjust the duration in each of one or more of the first track headers, the second track headers, the first edit lists, the second edit lists, the first media headers, the second media headers to account for the new media length;

adjust the sample count in the time-to-sample structure in one or more of the first and second sample tables;

add additional samples to the sync-sample structure in one or more of the first and second sample tables;

adjust the sample-to-chunk structure in one or more of the first and second sample tables to account for the additional samples;

add the additional samples to the sample size structure in one or more of the first and second sample tables;

adjust the chunk offset structure in one or more of the first and second sample tables to account for the additional samples and adding the new chunks to the structure;

recalculate the size of each of one or more of the first track headers, second track headers, first edit lists, second edit lists, first media headers, second media headers, first sample tables, and second sample tables before the first or second nested for-loops end;

recalculate a total size of all of the first stream header, the second stream header, the first track headers, the second track headers, the first edit lists, the second edit lists, the first media headers, the second media headers, the first sample tables, and the second sample tables; and readjust a chunk-to-offset table based on the recalculation of the total size.

20. The apparatus of claim 13, wherein:

the first stream header, the first track headers, the first media headers, the second stream header, the second track headers, and the second media headers are adjusted and written to a temporary memory and then written to the output media stream; and the media data of the first media stream and the second media stream are directly piped onto the output media stream without using any temporary memory.

21. The apparatus of claim 13, wherein pipe onto the output media stream media data of the first and second adjusted media streams comprises:

concurrently read the media data from the first adjusted media stream and the second adjusted media stream and write the media data to the output media stream so that no temporary output storage is used while piping onto the output media stream the media data of the first and second adjusted media streams.

22. An apparatus, comprising:

means for receiving a first media stream formatted into a first container file format and encoded using a first codec, the first media stream comprising a first stream header and one or more first tracks, each first track comprising a first track header, one or more first edit lists, and one or more first media, each first media comprising a first media header and one or more first sample tables specifying locations and durations of sample data within the first media stream;

means for receiving a second media stream formatted into the first container file format and encoded using the first codec, the second media stream comprising a second stream header and one or more second tracks, each second track comprising a second track header, one or more second edit lists, and one or more second media, each second media comprising a second media header and one or more second sample tables specifying locations and durations of sample data within the second media stream;

means for reading the first stream header, the first track headers, the first edit lists, the first media headers, and the first sample tables;

means for reading the second stream header, the second track headers, the second edit lists, the second media headers, and the second sample tables;

means for adjusting one or more of the first stream header, the second stream header, the first track headers, the second track headers, the first edit lists, the second edit lists, the first media headers, the second media headers, the first sample tables, and the second sample tables in both streams in order to effect the insertion of the first media stream into the second media stream without removing any content of the second media stream;

means for writing onto an output media stream the adjusted first and second media streams; and means for piping onto the output media stream media data of the first and second adjusted media streams, wherein the means for piping onto the output media stream media data of the first and second media streams comprise means for utilizing file channels that operate on temporary copies of the first and second media streams, wherein each file channel is operative to establish a buffer directly mapped to file contents in the first and second media streams using memory-mapped I/O.

23. The apparatus of claim 22, wherein:

the first stream header, the first track headers, the first media headers, the second stream header, the second track headers, and the second media headers are adjusted and written to a temporary memory and then written to the output media stream; and the media data of the first media stream and the second media stream are directly piped onto the output media stream without using any temporary memory.

24. The apparatus of claim 22, wherein means for piping onto the output media stream media data of the first and second adjusted media streams comprises:

means for concurrently reading the media data from the first adjusted media stream and the second adjusted media stream and writing the media data to the output media stream so that no temporary output storage is used while piping onto the output media stream the media data of the first and second adjusted media streams.

* * * * *